April 18, 1967 P. O. W. HOPKINSON 3,314,371
DIAPHRAGM PUMP
Filed Sept. 22, 1965

INVENTOR.
PAUL OLIVER W. HOPKINSON
BY
Brown, Critchlow,
Flick & Peckham
ATTORNEYS.

United States Patent Office 3,314,371
Patented Apr. 18, 1967

3,314,371
DIAPHRAGM PUMP
Paul Oliver W. Hopkinson, Gibsonia, Pa., assignor to St. Barnabas Free Home, Inc., Gibsonia, Pa., a non-profit corporation of Pennsylvania
Filed Sept. 22, 1965, Ser. No. 489,258
6 Claims. (Cl. 103—148)

ABSTRACT OF THE DISCLOSURE

The pumping chamber of a diaphragm pump is formed in an elongated gasket opening, which is wider adjacent one of its end portions than the other. The gasket engages one side of a block provided with inlet and outlet orifices opening into the end portions of the gasket opening. A flexible diaphragm covers the other side of the gasket and is moved into and out of contact with the orifices to open and close them.

It is among the objects of this invention to provide a pump which is simple and inexpensive in construction, which is very quiet in operation, which has a minimum of parts, in which the only moving part that the liquid comes in contact with is a flexible diaphragm, in which the diaphragm also forms the valve closures, and which can deliver as little as a fraction of a cubic centimeter of liquid per minute.

In accordance with this invention a pair of fluid passages extend through a block and have orifices at the same side of the block. The opposite end of one passage serves as the inlet for the pump, while the corresponding end of the other passage is the outlet. A gasket engages the block around the two orifices and is provided with an opening, into which the orifices open. The gasket opening has end portions concentric with the orifices and connected by a narrower central portion. The gasket could be omitted and the opening formed by a recess in the side of the block itself. The orifice connected with the pump inlet is an inlet into the gasket opening, and the other orifice is an outlet from that opening. The gasket opening is covered by a flexible diaphragm that is sealed against the gasket around the opening. A pin is coaxial with each orifice and engages the outer surface of the diaphragm. The pins are smaller than the end portions of the gasket opening. Continuously operating means periodically force first one pin and then the other inwardly to push the adjoining portions of the diaphragm into the gasket opening to close the orifices alternately. The narrower central portion of the gasket opening has a wider area adjacent the inlet orifice than adjacent the outlet orifice. The result is that the flexing diaphragm will draw liquid in through the inlet orifice and force it out through the outlet orifice.

The invention is illustrated in the accompanying drawings, in which

Figure 1:
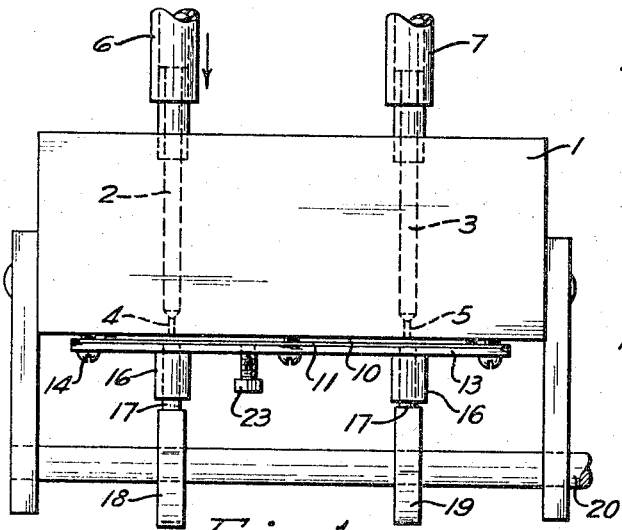
Figure 4:
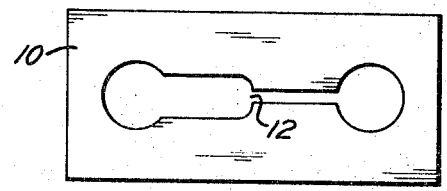
Figure 5:
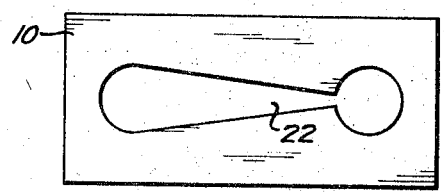
Figure 2:
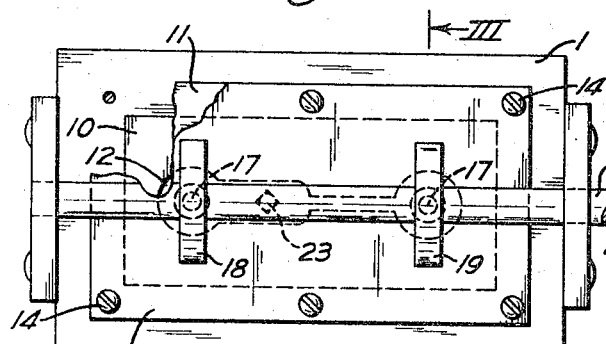
Figure 3:
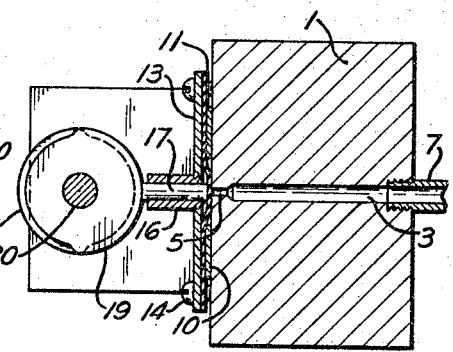

FIG. 1 is a plan view of the pump;
FIG. 2 is a front view, with parts broken away;
FIG. 3 is a vertical section taken on the line III—III of FIG. 2;
FIG. 4 is an elevation of the gasket alone;
FIG. 5 is a similar view of a modified gasket; and
FIGS. 6 to 9 are enlarged diagrammatic views illustrating the supposed operation of the pump.

Referring to FIGS. 1 to 4 of the drawings, the pump has a body which most suitably is in the form of a rectangular block 1. It is provided with a pair of laterally spaced fluid passages 2 and 3 extending through it and terminating at one side of the block in reduced end portions that form orifices 4 and 5 respectively. Each orifice preferably is about 1/32-inch in diameter. It should be about as small as possible consistent with the liquid that is to be pumped. The opposite or outer end of each passage is connected with a conduit. The conduit 6 connected to passage 2 extends away to a supply of liquid to be pumped, while the other conduit 7 connected to the other passage carries the liquid away from the pump.

Engaging the side of the block that contains the orifices, there is a thin sealing gasket 10 that may be cemented to the block around the orifices. The gasket is covered by a flexible diaphragm 11 that forms the outer wall of a thin chamber 12 formed by the gasket opening. A stiff plate 13 covers the outer face of the diaphragm and may be attached to the block by means of screws 14 that are tightened to cause the plate to press the diaphragm tightly against the gasket so that the chamber will be sealed. An equivalent of this would be to form the chamber in the side of the block itself and omit the gasket, but that would be a more expensive operation.

In axial alignment with each orifice the stiff plate is provided with a circular opening, in which one end of a small sleeve 16 is rigidly mounted. The sleeves extend outwardly away from the plate and slidingly support pins 17 that project from the outer ends of the sleeves. By pushing these pins inwardly toward the block, the areas of the diaphragm directly opposite the orifices can be forced across chamber 12 to close the orifices. The two pins are intended to be operated alternately in order to close first one orifice and then the other. This is done by any suitable means, such as by cams 18 and 19 rigidly mounted on a rotatable shaft 20 that is driven continuously by a motor (not shown).

It is a feature of this invention that as pins 17 move back and forth to flex the diaphragm, liquid is drawn into the chamber 12 through orifice 4 and expelled from the chamber through the other orifice 5. In order to cause this pumping action the gasket opening, which forms chamber 12, has end portions that are substantially concentric with the orifices and that are connected by a narrower central portion. If these end portions are the same size and the connecting portion has a uniform width from end to end, no pumping will occur because the liquid drawn into the chamber when the diaphragm moves away from the inlet orifice will be expelled from the chamber through the same orifice as the diaphragm closes it. However, if the area of the narrow central portion of the chamber adjacent the inlet orifice is wider than adjacent the outlet orifice, pumping does occur. The difference in width of the two ends of the central portion of the chamber can be produced by providing it with parallel edges, with those at one end farther apart than at the other end as best shown in FIG. 4, or by tapering the central portion of the gasket opening 22 from end to end as shown in FIG. 5.

Figure 6:
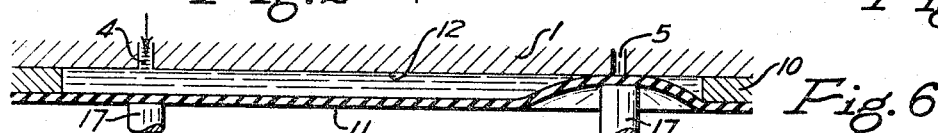
Figure 7:
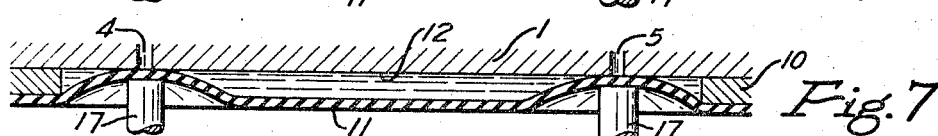
Figure 8:
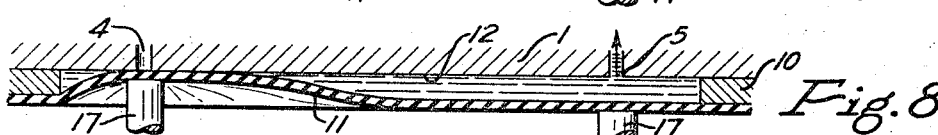
Figure 9:
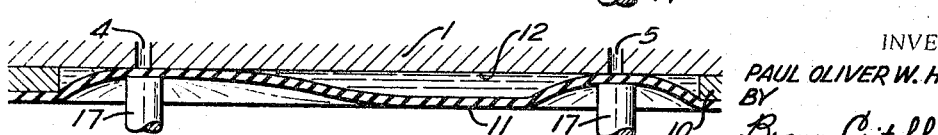

Although there is no doubt whatever about the pumping, it is not absolutely certain why it occurs. The best explanation seems to be that as the inlet orifice 4 opens while the outlet orifice remains closed, liquid is drawn into chamber 12 through the inlet as shown in FIG. 6. Then, when the diaphragm closes the inlet, liquid is trapped in the narrower central portion of the chamber and fills that portion as shown in FIG. 7. When the diaphragm is allowed to move away from outlet orifice 5 to open it as shown in FIG. 8, the portion of the diaphragm covering the wide end of the chamber's central portion bends or flexes toward the block because of the pressure of the adjoining pin. This forces liquid from the wide toward the narrow end of the central portion of the chamber and out of the outlet orifice. Movement of the diaphragm toward outlet orifice 5 to close it, as shown in FIG. 9, continues to force liquid out through passage 3. Then the inlet orifice is opened and the cycle is repeated. It therefore appears that it is some of the small amount of liquid that fills the wide end of the narrow central portion of chamber 12 when the inlet is open which is forced toward the outlet orifice after the inlet has been closed and the outlet has been opened.

With this pump, the quantity of liquid drawn in and expelled during each cycle can be so small that even with the cam shaft 20 rotating fast enough to produce a substantially steady flow, the output can be less than 1/10 of a cubic centimeter per minute. The rate can be reduced even further by pressing the diaphragm part way into the wide part of the narrow portion of chamber 12 and holding it there during pumping. This can be done in a very simple manner by threading a screw 23 through the rigid plate and using it to push the adjoining portion of the diaphragm toward the block. It will be seen that the deflected portion of the diaphragm will reduce the capacity of the wide area of the chamber and thereby reduce the amount of liquid that can be pumped during each cycle.

This pump can be converted into a valve for use in a liquid line where there is a pressure drop that normally causes the liquid to flow, by simply substituting for gasket 10 a gasket in which the portion of the gasket opening between the inlet and outlet has a uniform width. With such a gasket, there will be no pumping action as pins 17 move in and out to flex the diaphragm, but as the orifices are opened and closed minute measured amounts of liquid will be allowed to pass through the device.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A diaphragm pump comprising a block having a pair of fluid passages extending therethrough and each provided with an orifice at the same side of the block, a gasket engaging said side of the block and provided with an opening into which said orifices open, said opening having end portions substantially concentric with said orifices and connected by a narrower central portion forming a pumping chamber between the orifices, one of the orifices being an inlet into said opening and the other orifice being an outlet from it, a flexible diaphragm covering said opening and sealed against the gasket around it, a pin coaxial with each orifice and engaging the outer surface of the diaphragm, means supporting the pins, the pins being smaller than said end portions of the gasket opening, and continuously operating means for periodically forcing first one pin and then the other inwardly to push the adjoining portions of the diaphragm into said opening to close said orifices alternately, said pumping chamber having a wider area adjacent the inlet orifice than adjacent the outlet orifice, the volume of the pumping chamber being reduced by the diaphragm while it is closing said inlet orifice, whereby the diaphragm will draw liquid in through the inlet orifice and force it out through the outlet orifice.

2. A diaphragm pump according to claim 1, in which said pin-supporting means include a rigid plate pressing against the diaphragm and provided with openings slidably receiving said pins.

3. A diaphragm pump according to claim 1, in which said narrower portion of said gasket opening tapers from the inlet orifice toward the outlet orifice.

4. A diaphragm pump according to claim 1, in which said side walls of said wider area of said gasket opening are substantially parallel.

5. A diaphragm pump according to claim 1, including adjustable means for pressing the diaphragm into said wider area and holding it there while the pins reciprocate.

6. A diaphragm pump comprising a block having a pair of fluid passages extending therethrough and each provided with an orifice at the same side of the block, a gasket engaging said side of the block and provided with an opening into which said orifices open, said opening having end portions connected by a central portion, one of the orifices being an inlet into said opening and the other orifice being an outlet from it, said gasket opening being wider adjacent the inlet orifice than adjacent the outlet orifice to form a pumping chamber between the orifices, a flexible diaphragm covering said opening and sealed against the gasket around it, a pin coaxial with each orifice and engaging the outer surface of the diaphragm, means supporting the pins, the pins being smaller than said end portions of the gasket opening, and continuously operating means for periodically forcing first one pin and then the other inwardly to push the adjoining portions of the diaphragm into said opening to close said orifices alternately, the volume of the pumping chamber being reduced by the diaphragm while it is closing said inlet orifice.

References Cited by the Examiner

UNITED STATES PATENTS

| | | | |
|---|---|---|---|
| 2,356,738 | 8/1944 | Brugger | 103—152 |
| 2,816,514 | 12/1957 | Freese | 103—152 |
| 2,819,678 | 1/1958 | Nordell et al. | 103—150 |
| 3,151,783 | 10/1964 | Shaw et al. | 222—450 X |

ROBERT M. WALKER, *Primary Examiner.*

W. L. FREEH, *Assistant Examiner.*